United States Patent
Swadling et al.

(10) Patent No.: US 8,813,380 B2
(45) Date of Patent: Aug. 26, 2014

(54) TRAMMEL ASSEMBLY FOR ROTOR PITCH LINKS AND METHOD OF USING SAME

(75) Inventors: Linda Swadling, Ft. Walton Beach, FL (US); Bryan Hinman, St. Augustine, FL (US)

(73) Assignee: Walin Tools, LLC, Ft. Walton Beach, FL (US)

( * ) Notice: Subject to any disclaimer, the term of this patent is extended or adjusted under 35 U.S.C. 154(b) by 376 days.

(21) Appl. No.: 13/191,974

(22) Filed: Jul. 27, 2011

(65) Prior Publication Data

US 2012/0151768 A1  Jun. 21, 2012

Related U.S. Application Data

(60) Provisional application No. 61/369,404, filed on Jul. 30, 2010.

(51) Int. Cl.
*G01B 5/24* (2006.01)

(52) U.S. Cl.
USPC .................................. 33/549; 33/530; 33/645

(58) Field of Classification Search
USPC ........... 33/1 N, 203.2, 203.21, 530, 549, 613, 33/645
See application file for complete search history.

(56) References Cited

U.S. PATENT DOCUMENTS

| | | | |
|---|---|---|---|
| 3,786,695 A | 1/1974 | Barrett, Jr. | |
| 4,053,123 A | 10/1977 | Chadwick | |
| 4,642,901 A * | 2/1987 | Webb | 33/530 |
| 5,946,981 A | 9/1999 | Ide et al. | |
| 6,192,595 B1 * | 2/2001 | Stewart | 33/530 |
| 6,442,857 B1 * | 9/2002 | Atsuhiko et al. | 33/553 |
| 6,557,601 B1 * | 5/2003 | Taylor | 33/430 |
| 2002/0083609 A1 * | 7/2002 | Melzer et al. | 33/555 |
| 2007/0166162 A1 | 7/2007 | Podgurski | |
| 2008/0209747 A1 * | 9/2008 | Chang | 33/530 |
| 2009/0205404 A1 * | 8/2009 | Swadling | 73/7 |
| 2009/0223073 A1 * | 9/2009 | Tu | 33/530 |
| 2009/0300379 A1 | 12/2009 | Mian et al. | |
| 2013/0212853 A1 * | 8/2013 | Werner et al. | 33/645 |

* cited by examiner

*Primary Examiner* — G. Bradley Bennett

(74) *Attorney, Agent, or Firm* — GrayRobinson, P.A.; Michael J. Colitz, III

(57) ABSTRACT

Described is a trammel set tool designed to measure the center-to-center location of the bearings mounted on a pitch change link. Because pitch change links have two replaceable "lollypop" rod ends, it may be necessary at some point to replace an entire rod end, not just the bearing. The trammel set tool provides the operator the capability to remove an unserviceable rod end, and reinstall a new rod end to the same settings while taking into consideration.

9 Claims, 2 Drawing Sheets

TRAMMEL ASSEMBLY FOR ROTOR PITCH LINKS AND METHOD OF USING SAME

CROSS REFERENCE TO RELATED APPLICATIONS

This application claims priority to Provisional Application Ser. No. 61/369,404 filed on Jul. 30, 2010 and entitled "Trammel Set Tool Assembly." The contents of this application are fully incorporated herein for all purposes.

BACKGROUND OF THE INVENTION

1. Field of the Invention

The present invention relates to trammel assembly. More specifically, the present invention relates to a tool that is designed to measure the center to center location of bearings within a pitch change link.

2. Description of the Background Art

In a helicopter rotor assembly, pitch change linkages are utilized in the control and operation of rotor blades. The pitch change link length is manually adjustable in order to track the rotor properly so that all blades of the helicopter turn and function property. The pitch change links are adjustable to increase or decrease the length of the link and thereby change the pitch of the rotor blade.

Difficulty arises when maintenance personnel have to service pitch change links. Namely, if changes are made, the maintenance personnel may not recall the original position of the pitch change links. Pitch change links also include rod ends that periodically need to be replaced. when replacing rod ends, maintenance personnel likewise have no reliable way to reinstall new rod ends with the original settings. As a result of the foregoing, maintenance personnel must use timing consuming and inaccurate methods for servicing pitch change links.

Therefore, it is an object of this invention to provide an improvement which overcomes the aforementioned inadequacies and provides a means for ensuring an accurate and repeatable way to service and maintain pitch change links.

SUMMARY OF THE INVENTION

For the purpose of summarizing this invention, this invention relates to a trammel set tool that is designed to measure the center to center location of pitch change link bearings.

An advantage of the present invention is that it permits service personnel to property calibrate pitch change links following service and/or maintenance.

Still yet another advantage of the present invention is to provide a means for easily replacing the rod ends of a pitch change link.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

| PARTS LIST | |
|---|---|
| 10 | Set Tool |
| 12 | Rotor Pitch Link |
| 14 | First and Second Rod Ends |
| 16 | Central Housing |
| 18 | First and Second Bearing |
| 20 | Mount Plate |
| 22 | Feet |
| 24 | Left Locator Block |
| 26 | Slide Block |
| 28 | Lock Handle |
| 32 | Linear Slide Bar |
| 34 | Right End Locator Block |
| 36 | Locator Pins |
| 38 | Set Screws for Left Locator Block |
| 42 | Set Screw for Right Locator Block |

DETAILED DESCRIPTION OF THE PREFERRED EMBODIMENT

The trammel set tool assembly is designed to measure the center-to-center location of the bearings mounted on a rotor pitch link or pitch change link. Because rotor pitch links have two replaceable "lollypop" rod ends, it may be necessary at some point to replace an entire rod end, not just the bearing. The trammel assembly and method of the present disclosure allows a user to remove an unserviceable rod end and reinstall a new rod end while maintaining the same overall link length. Moreover, this can be accomplished while taking into consideration the bearing tolerances from both rod ends.

Figure 1:
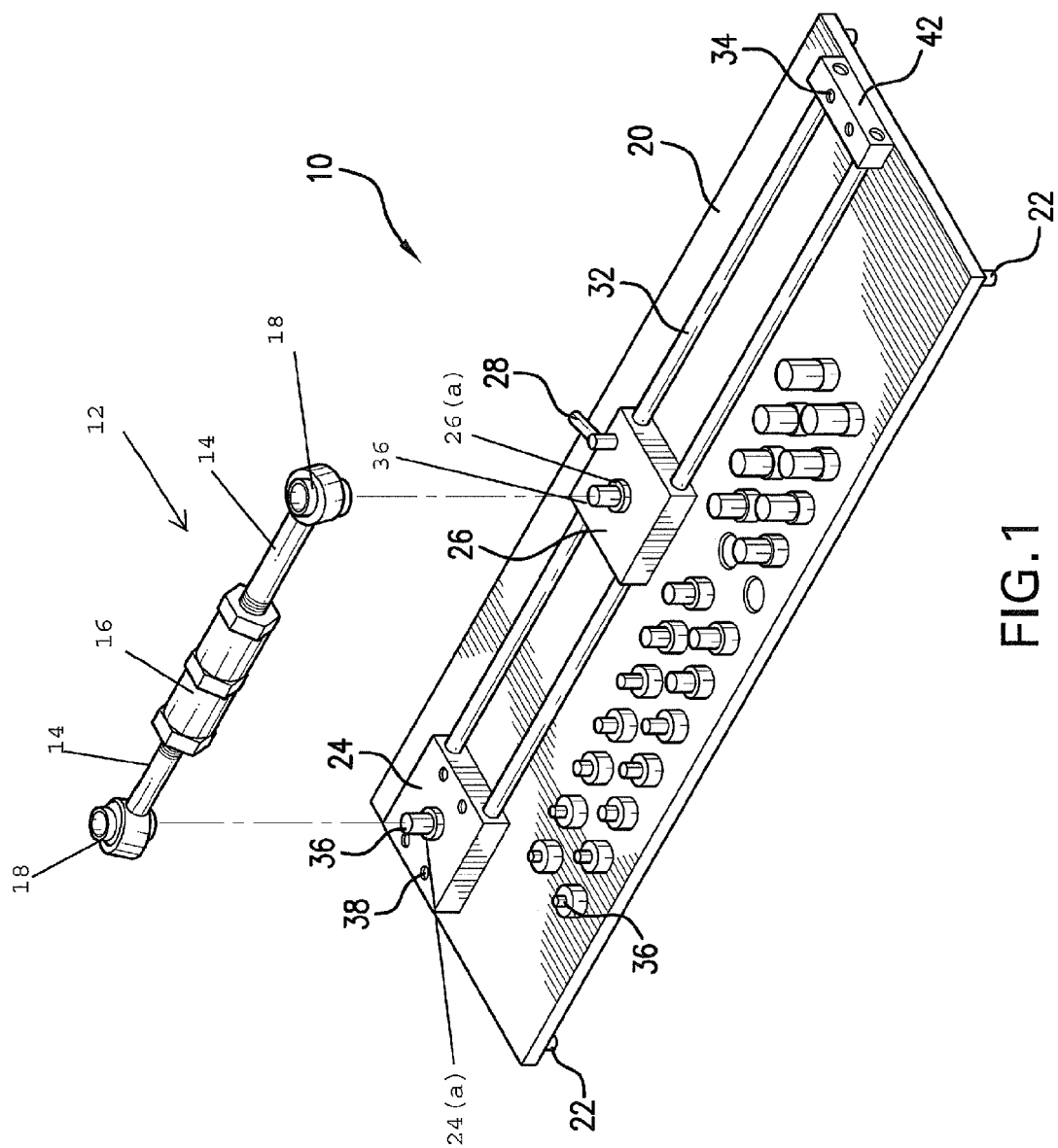
FIG. 1 is a perspective view of the trammel set tool of the present invention.

FIG. 1 illustrates the assembly 10 and an associated rotor pitch link 12. The rotor pitch link has first and second rod ends 14 that are threadably received within a central housing 16. First and second rotatable bearings 18 are formed within the first and second rod ends, respectively. As is known, the rotor pitch link has an adjustable length and is adapted to be connect to the rotor assembly of an aircraft.

Assembly 10 includes a mounting plate 20 that has upper and lower surfaces and first and second ends. A set of feet 22 are secured to the lower surface of plate 20. Feet 22 are adapted to horizontally support the mounting plate 20 upon a work surface. Plate 20 includes first and second locator blocks (34 and 24). More specifically, a first locator block 34 secured to the first end of the mounting plate 20. First locator block 34 is secured to the upper surface of mounting plate 20 by set screws 42. The second locator block 24 is likewise secured to the upper surface of the second end of the mounting plate 20 via set screws 38. A locking aperture 24(a) is secured within second locator block 24.

A pair of linear slide bars or rails 32 are supported over plate 20. Bars 32 are defined by first and second ends and intermediate extents. The first ends are secured within first locator block 34, the second ends are secured within the second locator block 24. A slide block is included and has two internal cylindrical apertures to accommodate bars 32. Slide block 26 is slidably positioned along slide bars 32 by way of the cylindrical apertures. This permits slide block 26 to be selectively positionable along the intermediate extents of the linear slide bars 32. Slide block 26 includes a locking aperture 26(*a*) within its upper surface. A locking handle 28 is pivotally mounted within block 26 and is used to selectively engage a locking cam with bars 32 and, thereby, lock slide block 26 at a position along the intermediate extents of bars 32.

A series of locator pins 36 of varying size are removably positioned upon the mounting plate via apertures. A first locator pin 36 of the series is removably secured within locking aperture 26(*a*). A second locator pin 36 of the series is removably secured within the second locking aperture 24(*a*). This permits rotor pitch link 12 to be secured between the second locator block 24 and slide block 26 by inserting the locator pins 36 in the bearings 18. The position of the slide block 26 can be adjusted depending upon the length of the rotor pitch link and the length of the rod ends 14.

To set up the tool, the user determines the inside diameter for each bearing 18 in both ends 14 of the pitch link 12. This diameter is matched to the appropriate locator pin 36 located on the front side of the trammel set tool 10. The locators pins 36 are positioned in the recessed areas 24(*a*) and 26(*a*) of the stationary locator block 24 and the movable slide block 26. The handle 28 associated with the slide block 26 is then loosened. The pitch change link 12 is then positioned over both locator pins 36. The rod end bearings 18 in either end of the change link 12 are then slid down over each pin 36. The position of the slide block 26 along the linear slide bar 32 can be adjusted to the left or right. This is done to center the pins 36 between the maximum amounts of travel. The sliding block 26 is thereafter locked with respect to slide bar 32 and mount plate 20 via lock handle 28.

The pitch change link 12 can then be removed from the set tool 10. The affected rod end 14 can be replaced in accordance with the appropriate technical manual. The jam nut is left loose during the process. The newly replaced rod end 14 can be repositioned (with threads in or out) upon the tool 10 until both bearings 18 comfortably fall back into place on each pin 36. The length of rod ends 14 can be adjusted via a jam nut. Accordingly, the jam nut of link 12 can be re-torqued in accordance with the appropriate technical manual. In this manner, the pitch change link 12 is recalibrated to its original dimensions following the repair.

The trammel tool set is universally designed to perform center to center measurements to within 0.01" for UH-60 series as well as other pitch control, flight control rods, servos, and linkages requiring specific bearing measurement replacement, as specified in the UH-60 Maintenance Manuals. It can also be expanded to accommodate other helicopter platforms requiring similar maintenance procedures.

When the component is placed on the tool, it will accurately measure and record the center to center distance of UH-60 pitch control, flight control rods, servos, and linkage bearings to the nearest 0.01". The tool has component-specific pins that attach to the tool and fit the inside diameter of the bearing at each end. The tool can accommodate the 90 degree offset for M/R flight control rod ends and the pivot angle of M/R pitch control rod elastomeric bearings. A built-in graduated steel rule is integrated to the tool for measuring reference. A digital read-out can be mounted to the tool to show readings within 0.01" and will be able to lock a measurement to record and complete trammel measurement requirements.

Figure 2:
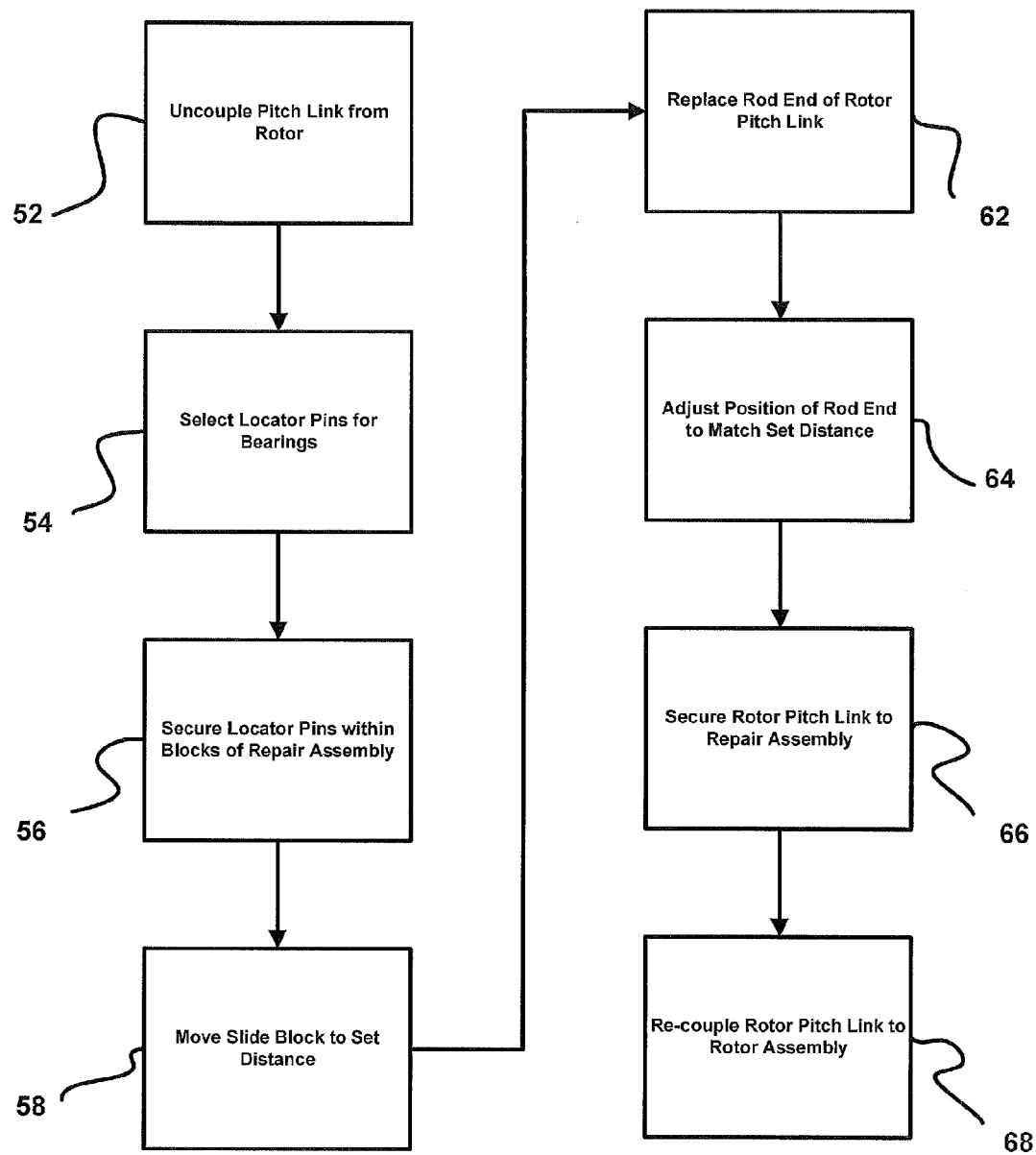
FIG. 2 is a flow chart illustrating the steps associated with the present invention.

FIG. 2 is a flow chart illustrating the various steps for repairing a rotor pitch link in accordance with the present disclosure. The steps include first uncoupling the rotor pitch link from the helicopter rotor assembly at step 52. Next, at step 54 a pair of locator pins are selected that correspond to the size of the bearings. The selected locator pins are then secured within the locator and slide blocks of the repair assembly at step 56. At step 58, the position of the slide block is set so that the distance between the locator pins corresponds to the set distance between the bearings of the rotor. Thereafter, at step 62 the user can service the rotor pitch link by replacing one or both of the rod ends. At step 64, the position of the replaced rod end is adjusted so that the length of the rotor pitch link corresponds to the set distance. At step 66, the rotor pitch link is then secured to the repair assembly by inserting the locator pins into the bearings, whereby the set distance of the rotor pitch link is confirmed. Finally, the rotor pitch can be re-coupled within the helicopter rotor assembly at step 68.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A trammel assembly comprising:

a rotor pitch link having first and second rod ends that are threadably received within a central housing, a first rotatable bearing formed within the first rod end, a second rotatable bearing formed within the second rod end, the rotor pitch link having an adjustable length and adapted to be connect to the rotor assembly of an aircraft;

a mounting plate having upper and lower surfaces and first and second ends, a set of feet for horizontally supporting the mounting plate upon a surface;

a first locator block secured to the first end of the mounting plate, the first locator block being secured to the upper surface of the mounting plate by set screws;

a second locator block secured to the second end of the mounting plate, the second locator block being secured to the upper surface of the mounting plate by set screws, a locking aperture secured within the second locator block;

a pair of linear slide bars having first and second ends, the first ends being positioned within the first locator block, the second ends being positioned within the second locator block, the linear slide bars having intermediate extents extending between the first and second ends;

a slide block with two internal cylindrical apertures, the slide block being slidably positioned upon the pair of linear slide bars by way of the cylindrical apertures, the slide block being selectively positionable along the intermediate extents of the linear slide bars, a locking aperture within the slide block, a locking handle and locking cam for locking the slide block at a position along the intermediate extents;

a series of locator pins of varying size being removably positioned upon the mounting plate, a first locator pin of the series being removably secured within the first locking aperture, a second locator pin of the series being removably secured within the second locking aperture, whereby the rotor pitch link can be secured between the second locator block and the slide block by inserting the locator pins in the bearings and wherein the position of the slide block can be adjusted depending upon the length of the rotor pitch link.

2. A trammel assembly comprising:

a mounting plate having upper and lower surfaces and first and second ends;

a first locator block secured to the first end of the mounting plate;

a second locator block secured to the second end of the mounting plate, a locking aperture secured within the second locator block;

a linear slide rail having first and second ends, the first end being positioned within the first locator block, the second end being positioned within the second locator block, the linear slide rail having an intermediate extent extending between the first and second ends;

a slide block slidably positioned upon the of slide rail, the slide block being selectively positionable along the intermediate extent of the linear slide rail, a locking aperture within the slide block;

a first locator pin being removably secured within the first locking aperture, a second locator pin being removably secured within the second locking aperture.

3. The trammel assembly as described in claim 2 further comprising a rotor pitch link having first and second rod ends, a first rotatable bearing formed within the first rod end, a second rotatable bearing formed within the second rod end, the rotor pitch link having an adjustable length and adapted to be connect to the rotor assembly of an aircraft.

4. The trammel assembly as described in claim 3 whereby the rotor pitch link can be secured between the second locator block and the slide block by inserting the locator pins in the bearings and wherein the position of the slide block can be adjusted depending upon the length of the rotor pitch link.

5. The trammel assembly as described in claim 2 wherein a series of locator pins of varying size are removably positioned upon the mounting plate.

6. The trammel assembly as described in claim 5 wherein a first locator pin of the series is secured within the first locking aperture, a second locator pin of the series is secured within the second locking aperture.

7. The trammel assembly as described in claim 2 further comprising a locking mechanism for locking the slide block at a position along the intermediate extent of the rail.

8. The trammel assembly as described in claim 2 wherein a pair of linear guide rails are included.

9. The trammel assembly as described in claim 8 wherein the slide block includes openings in which the pair of linear guide rails are inserted.

* * * * *